Sept. 19, 1967 G. B. GREENE 3,342,296
TYPEWRITER WITH MEANS TO DECREASE RATE OF OPERATION TO
PREVENT TYPEBAR MALFUNCTION
Filed Oct. 16, 1964 9 Sheets-Sheet 1

Inventor
GEORGE B. GREENE
BY: Rankin A. Milliken Atty.

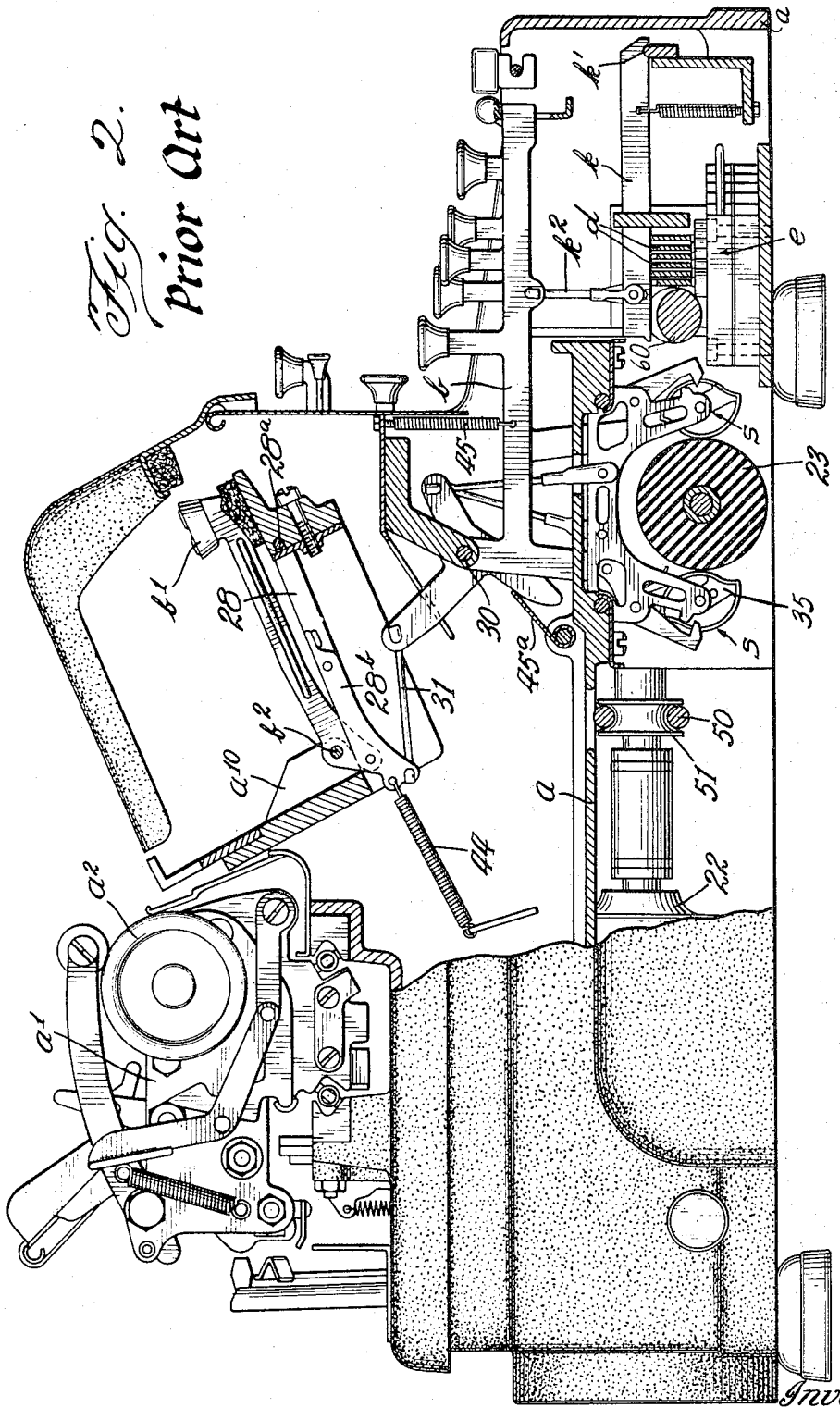

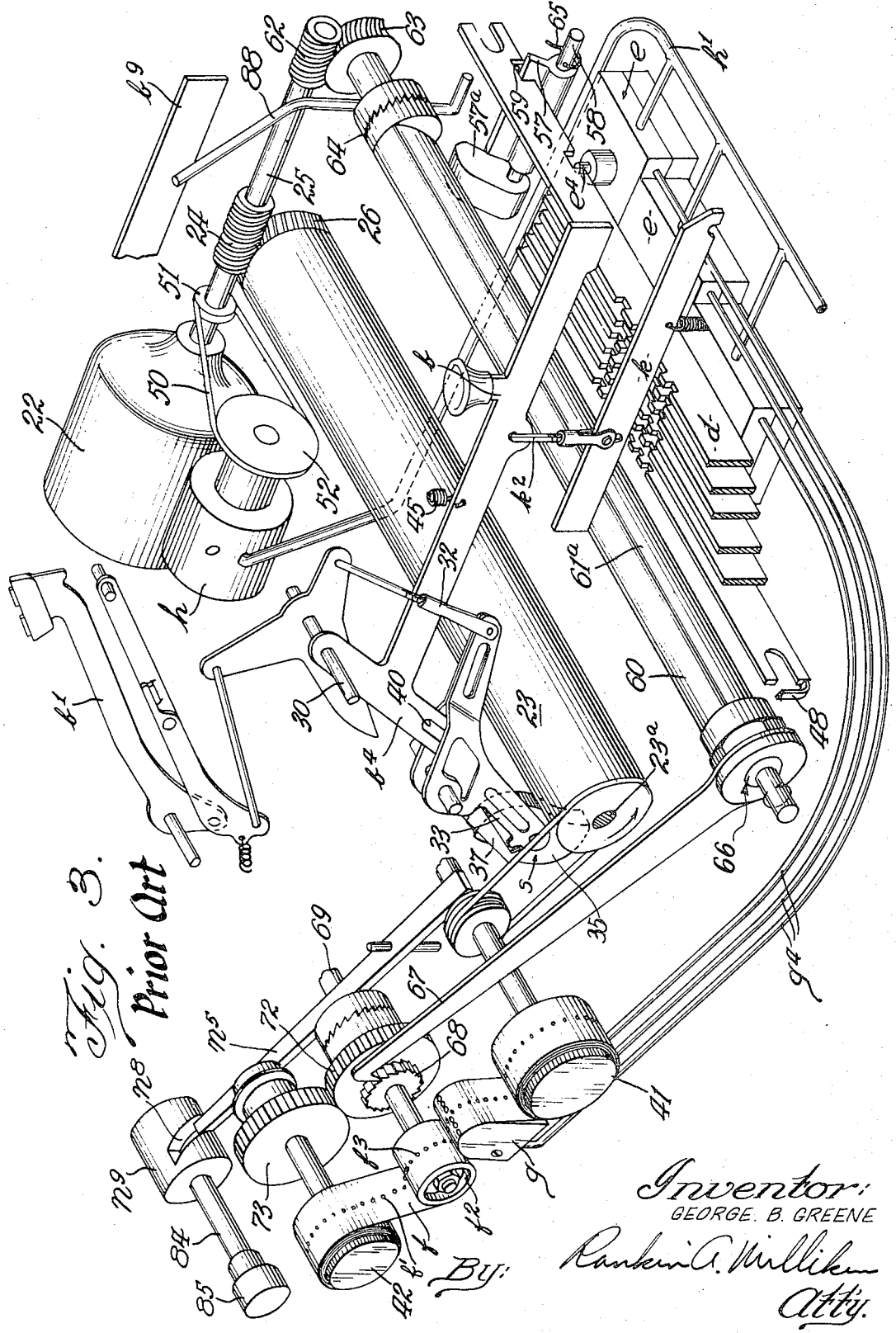

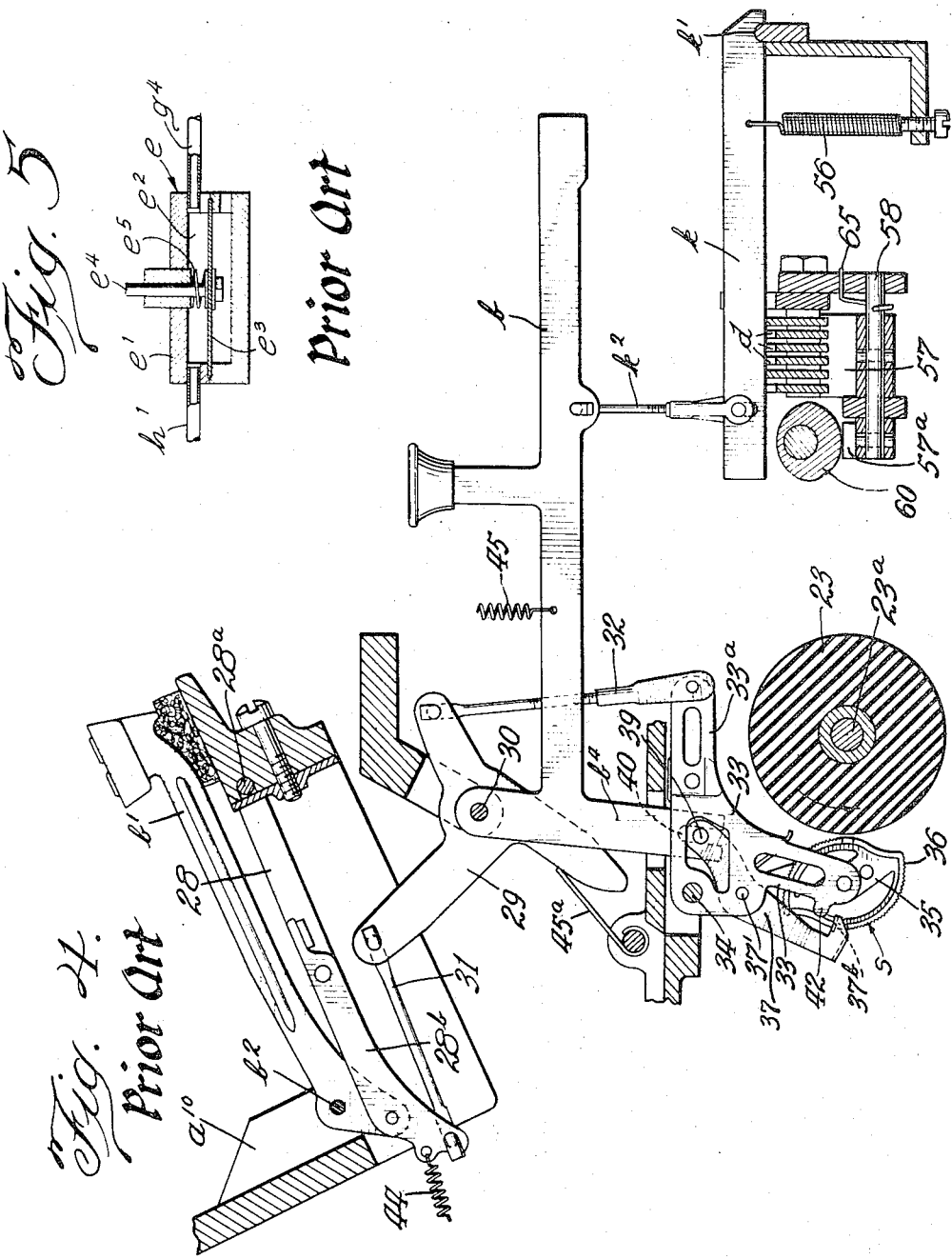

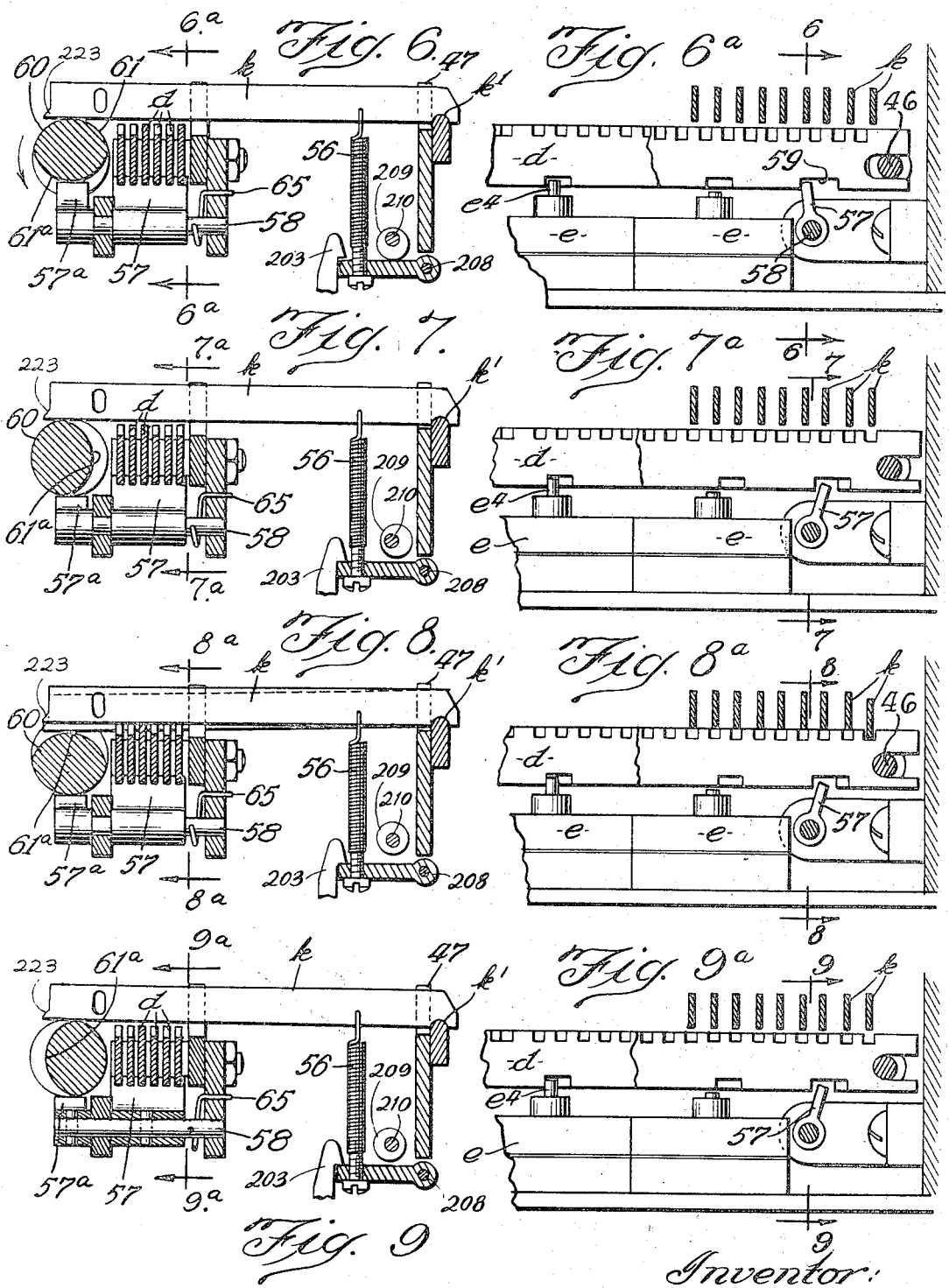

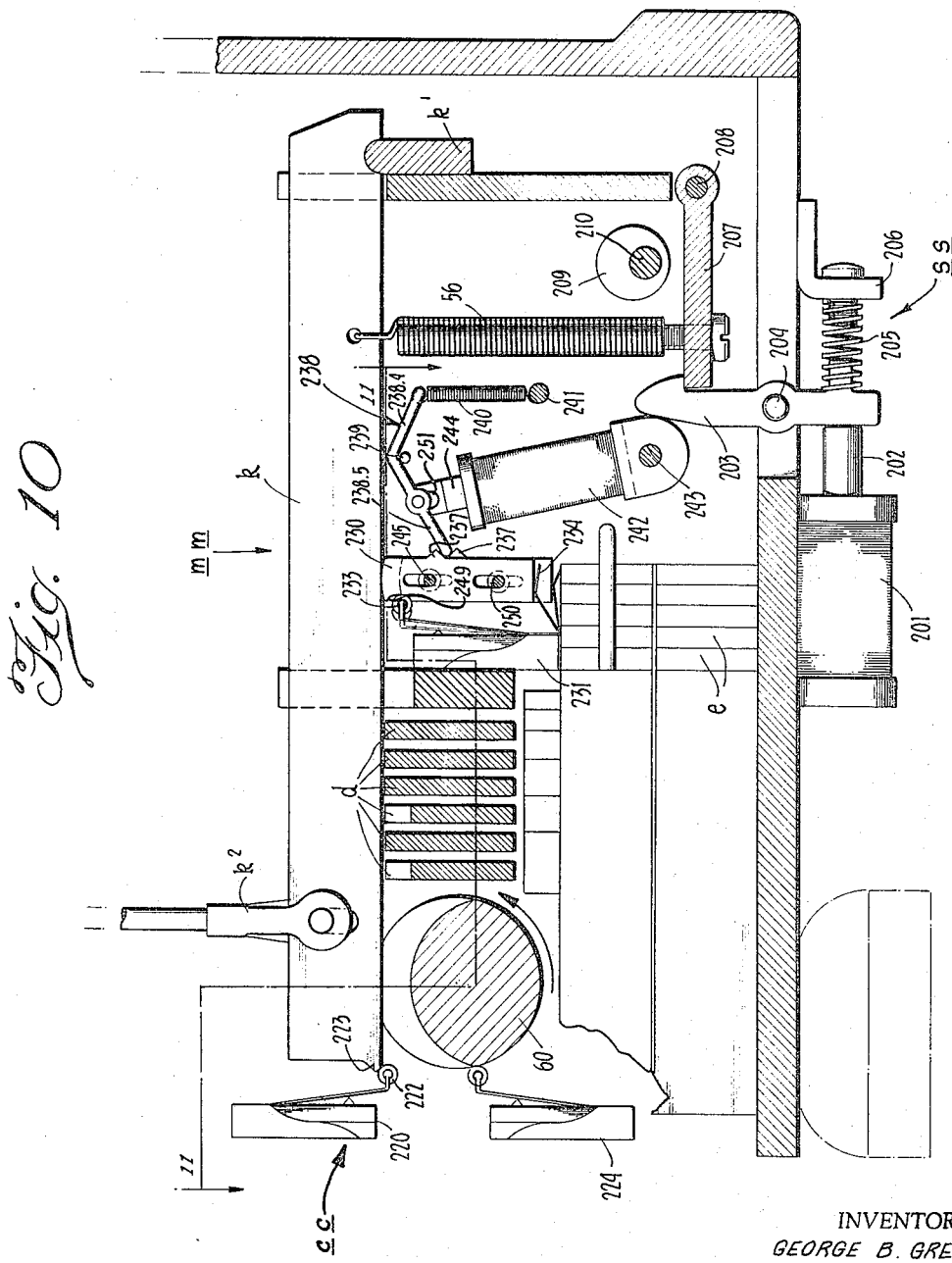

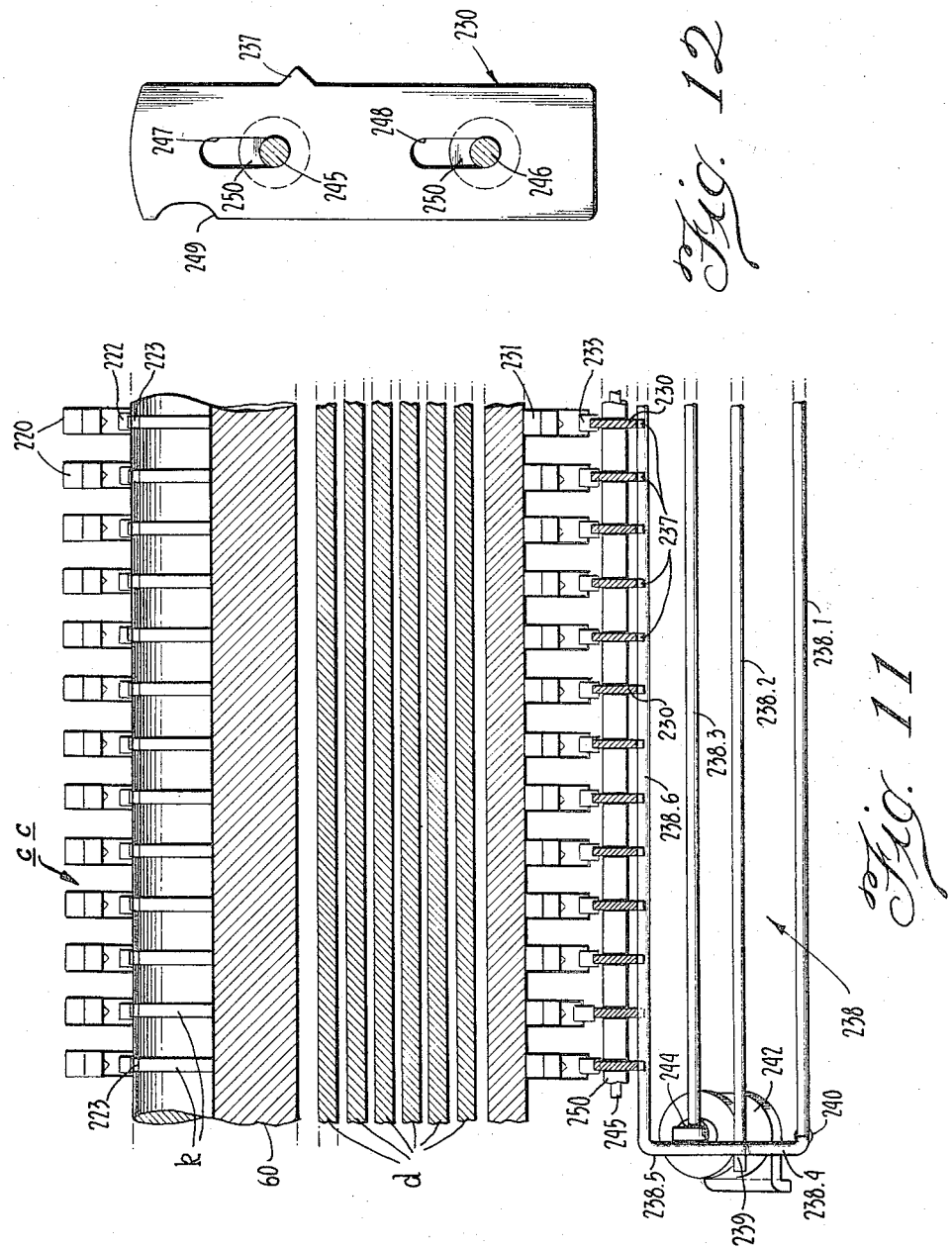

INVENTOR.
GEORGE B. GREENE
BY Rankin A. Milliken
ATT'Y

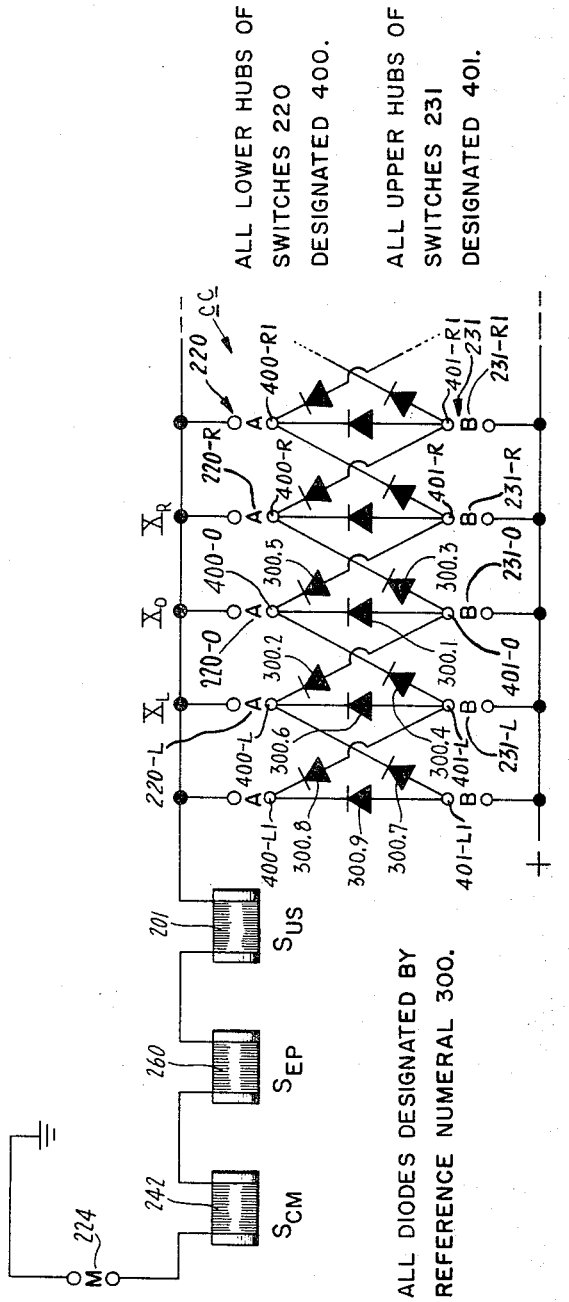

United States Patent Office 3,342,296
Patented Sept. 19, 1967

3,342,296
TYPEWRITER WITH MEANS TO DECREASE RATE OF OPERATION TO PREVENT TYPE-BAR MALFUNCTION
George B. Greene, Lafayette, Calif.
(2500 Anniversary Lane, Newport Beach, Calif. 92660)
Filed Oct. 16, 1964, Ser. No. 404,246
11 Claims. (Cl. 197—20)

This invention relates to improvements in automatic motorized typewriters, and, more particularly, to improved automatic control means for motorized typewriters by means of which high transcription speed, e.g., from perforated tape to typewritten text, may be attained without operating the type drive mechanism at speeds in excess of the optimum speed at which wear is reduced to the minimum consistent with imparting sufficient impact velocity to the type bars.

Automatic motorized typewriters have long been employed in the business data processing, communication, and computation arts, an example of such a device being shown in United States Patent No. 2,247,275, issued to A. H. Buckley on June 24, 1941. This patent will hereinafter be referred to as "Buckley."

Where high transcription speed is required, it is necessary to assure that successively actuated adjacent type bars do not collide, or interfere, and that repeated typewriting of any single symbol does not take place so rapidly that the associated type drive means, or key drive means, is not yet reset at the time of the second actuation, and, consequently, the impression corresponding to the second type drive means actuation is not made. It is also necessary that the type drive mechanism be operated at a sufficiently low cyclic rate to avoid excessive wear, to the degree consistent with imparting sufficient, controlled impact energy to the type hammers.

To meet the first two of these requirements, viz., avoiding interference of adjacent type bars and avoiding non-printing upon repeated actuation of the same key, it has been suggested that special piano-roll type typewriter-controlling rolls be employed, said rolls to be prepared by means of a special perforating machine adapted to immobilize those keys, the non-sloughed actuation of which would cause malfunction in the transcribing automatic typewriter, thus forcing the perforator operator to advance, or slough, the roll sufficiently to avoid such malfunction. This suggested mode of operation, however, has never come into general use for the reasons, inter alia, that it occasions considerable discomfort for the perforator operator and necessarily results in slow, and costly, preparation of the perforated rolls.

In addition, the use of the specially-prepared rolls suggested in the prior art requires not only a special perforator but a special automatic motorized typewriter adapted to operate at two speeds, the lower speed for the transcription of standard substantially non-sloughed rolls, or other forms of perforated copy, and the higher speed for the transcription of the specially-prepared rolls.

It is, therefore, an object of the instant invention to provide an automatic motorized typewriter capable of transcribing standard, i.e., substantially slough-free perforated tapes, perforated rolls, magnetic tapes, or the like, at speeds sufficiently high to produce malfunction in the absense of malfunction preventing means.

Another object of the instant invention is to provide an automatic motorized transcribing typewriter employing the power roll, or "Electromatic," type of type drive mechanism and capable of transcribing at high speed while at the same time minimizing wear of, and stress upon, the power roll and its associated shifting devices, or type drive means, etc.

Another object of the instant invention is to provide malfunction averting means adapted to transiently alter the operation of an automatic motorized typewriter to prevent malfunction due to mutual interference of adjacent type bars.

Another object of the instant invention is to provide an automatic motorized typewriter having malfunction averting means for preventing malfunction due to successive actuations of a single print key before the means by which power is imparted to said single print key is reset.

Another object of the present invention is to provide an automatic motorized transcribing typewriter having malfunction averting means adapted to prevent malfunctions due to both successive adjacent key actuations and successive single key actuations.

It is another object of the instant invention to provide an automatic motorized typewriter capable of transcribing standard perforated tapes, magnetic tapes, or the like, which are substantially free from sloughs at speeds sufficiently high to cause malfuction in the absence of the automatic malfunction prevention means described herein.

Other objects of the instant invention will, at least in part, be obvious, and will, in part, appear hereinafter.

The instant invention accordingly comprises the several steps, and the relation of one or more of such steps with respect to each of the others, and the apparatus embodying features of construction, combinations of elements, and arrangements of parts which are adapted to effect such steps, all as exemplified in the following detailed disclosure, and the scope of the instant invention will be indicated in the claims.

For a fuller understanding of the nature and objects of the invention, reference should be had to the following detailed description, taken in connection with the accompanying drawings, in which:

FIG. 2 is a cutaway of the conventional automatic motorized typewriter of the prior art shown in FIG. 1 and corresponds to FIG. 2 of Buckley;

FIG. 3 is a perspective drawing of certain principal components of the prior art automatic motorized typewriter shown in FIGS. 1 and 2, said principal components being largely those which co-operate to automatically control said typewriter in its automatic transcribing mode and corresponds to FIG. 3 of Buckley;

FIG. 4 illustrates on an enlarged scale the particular power roll type of type drive mechanism employed in the prior art automatic motorized typewriter shown in FIGS. 1 through 3, and is substantially the same as that shown in FIG. 23 of Buckley;

FIG. 5 is a cross-sectional elevation of a particular vacuum motor employed in the prior art automatic motorized typewriter shown in FIGS. 1 and 2 (see Buckley, FIG. 22);

Figure 13:
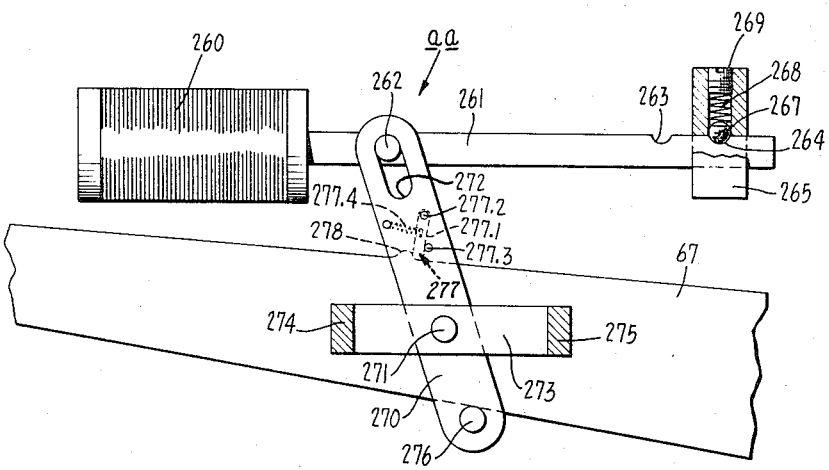
Figure 14:
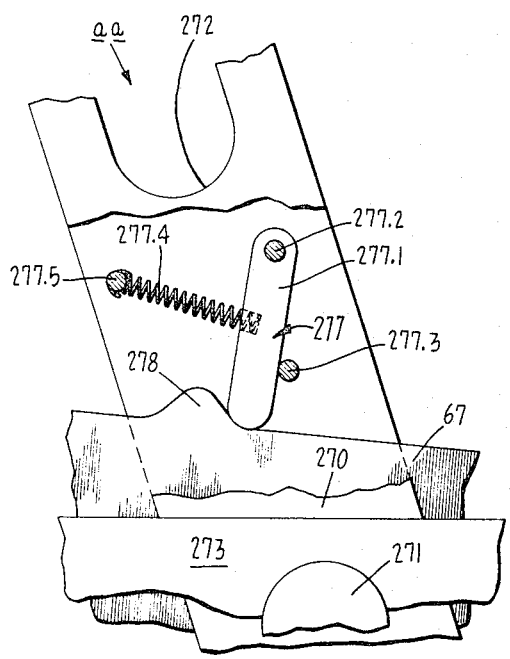
Figure 15:
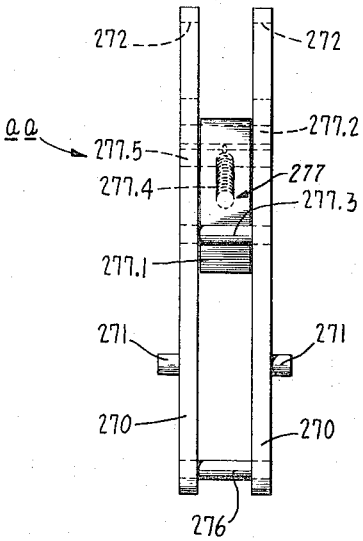

FIGS. 6 through 9 are cross-sectional views and FIGS. 6a through 9a are front views, respectively, for illustrating the manner of coaction between the controller bars, or permutation bars, and the key levers of the prior art motorized typewriter, as shown in FIGS. 15 through 18a of Buckley, and the means for disabling these key levers to abort printing, which means comprises a particular portion of the embodiment of the instant invention shown herein;

FIG. 10 is a cross-sectional view, on an enlarged scale, taken substantially on the same plane as FIGS. 6 through 9, for illustrating that part of the specific embodiment of the instant invention which is employed to "memorize" the identification of the key lever immediately previously actuated, determine the time in a power roll cycle at which certain actions are to take place, etc.;

FIG. 11 is a plan view of the structure shown in FIG. 10 taken along the planes substantially as indicated by the lines 11—11 indicated in FIG. 10;

FIG. 12 is an enlarged detail of a memory blade according to the instant invention;

FIGS. 13 through 15 are fragmentary views illustrating the self-restoring tape advance pawl hold-out means which constitutes a part of the embodiment of the preferred instant invention; and FIG. 16 is a schematic diagram of the circuit interconnections which constitute a part of the embodiment of the instant invention.

Figure 1:
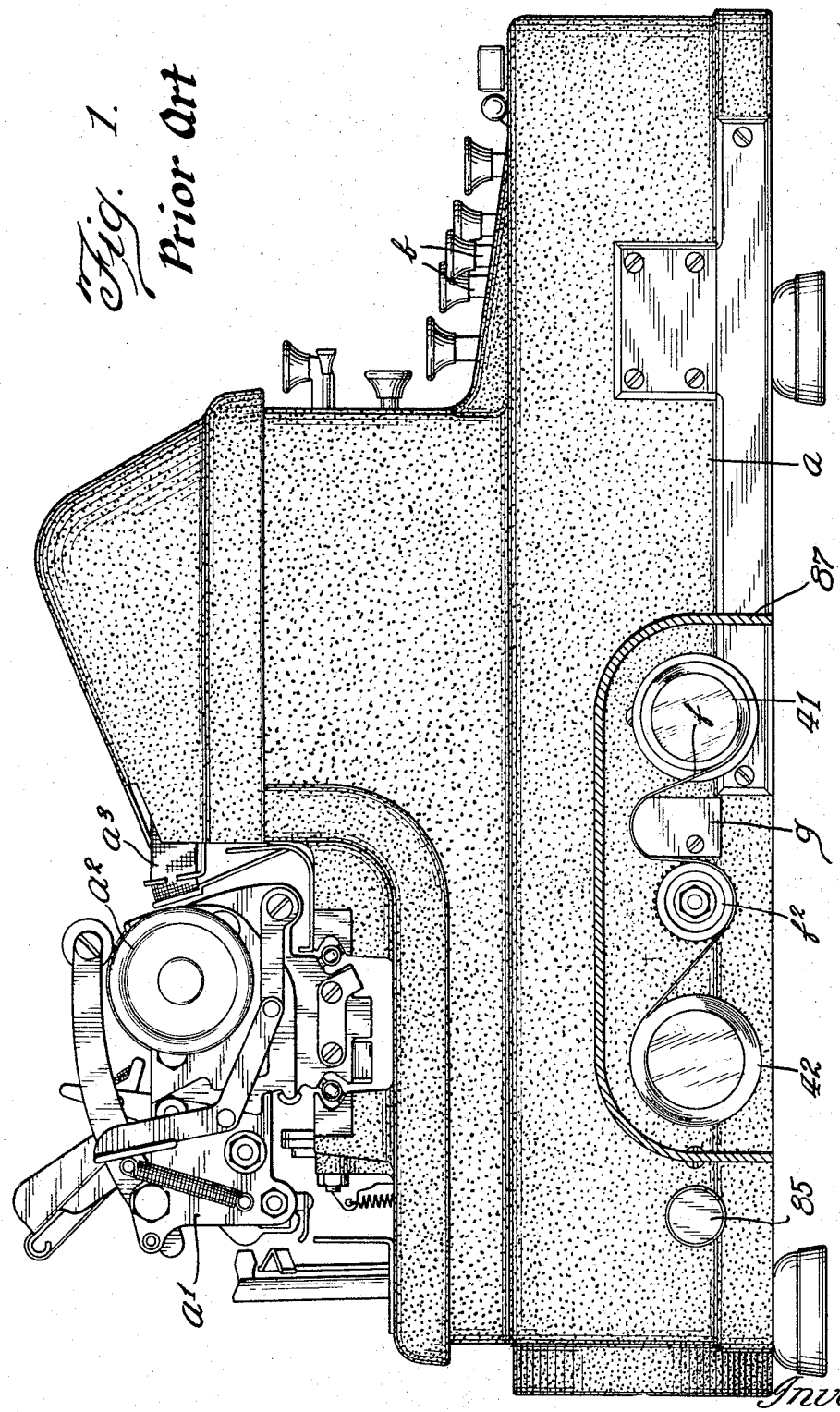
FIG. 1 represents a conventional automatic motorized typewriter of the prior art used for purposes of illustrating the present invention as shown in FIG. 1 of Buckley, No. 2,247,275.

FIGS. 1 and 2 illustrate in elevation a prior art automatic motorized typewriter adapted to automatically transcribe text in the form of perforated tape to typewritten form. While the instant invention is applicable to many well-known forms of automatic motorized typewriter, or other forms of automatic writing device, e.g., billing or posting machine, a particular form of the instant invention will be exemplified herein as applied to the automatic motorized typewriter shown and described in the above-mentioned Buckley patent. Reference is hereby made to Buckley for a showing and description of the structure and operation of such parts of Buckley as are not directly pertinent to the application of the instant invention to Buckley.

The figures of the drawings which include the legend "Prior Art" are taken directly from Buckley, and are believed to constitute a sufficient showing of prior art to enable those skilled in the art to fully comprehend the specific embodiment of the instant invention shown herein, and its application to a typical prior art automatic motorized typewriter.

Throughout the drawings, both those designated "Prior Art," and otherwise, the original reference numerals and letters of Buckley have been retained to facilitate reference to Buckley, if necessary. Generally, the reference symbols used herein which originate in Buckley, and may be used to refer thereto, are one-digit numbers, two-digit numbers, lower-case letters, or combinations thereof.

The reference symbols used herein to designate new parts not found in Buckley, or modifications of parts found in Buckley, are, generally, three-digit numbers, some of these three-digit numbers having decimal portions appended thereto to indicate, e.g., sub-portions of major assemblies. Generally, the same reference numerals refer to the same parts in all the views.

In FIG. 1, then, may be seen an end view in elevation of the typewriter of Buckley. Beneath cover 87 (shown cutaway) may be seen tape $f$, which is wound on a supply spool 41, drawn over the tracker-bar $g$, advanced step-by-step by a feed-drum $f^2$ which is provided with teeth $f^3$ (FIG. 3) for engaging a central longitudinal row of perforations $f^1$ in the tape $f$, and wound onto a take-up spool 42, by mechanism described in detail in Buckley. Knob 85 enables the operator to control the mechanism which drives supply spool 41 and take-up spool 42 in an advancing, or rewinding direction, this mechanism being described in Buckley.

FIG. 2 shows a cutaway end view in elevation of the typewriter of Buckley. In particular, FIG. 2 shows the now well-known type drive mechanism employed in Buckley, and many other motorized typewriters, and its location within the typewriter of Buckley, and relationship to the automatic controlling means of Buckley. This type drive mechanism, or key drive mechanism, comprises driving-roll, or power roll, 23 which is driven by motor 22 (FIG. 3) at a substantially constant speed, and extends transversely of the typewriter, and a plurality of shifting devices, or type drive means $s$, one per type bar, which are suspended in co-operative juxtaposition to power roll 23 by means of a bellcrank 33 (FIG. 4), each of said type drive means including actuating means, or latch means, each of which actuating means includes a dog 37 capable, upon depression and release of the corresponding key $b$, of unlatching the corresponding rotatable element 35 which, in turn, engages power roll 23 and is, thus, driven outward from roll 23, thereby rocking bellcrank 33 and causing power actuation of the corresponding type bar $b^1$. Thus, it will be understood by those skilled in the art that the type drive means $s$ have two characteristic rates of action, i.e., the cyclic rate $S_c$ of rotatable element 35 imparted by power roll 23, and the normal transcribing rate $S_{TN}$ (as contrasted to a delayed transcribing rate $S_{TD}$ of the present invention), at which the actuating means, or latch, is actuated. In Buckley the normal transcribing rate would correspond roughly to the delayed transcribing rate of the present invention. Further details of the type drive mechanism, or key drive mechanism, are shown in FIGS. 3 and 4, and more detailed description of the same will be found in Buckley.

Reference is now had to FIG. 3 which shows the automatic controlling means of Buckley, and its coaction with the type drive mechanism. In the operation of this automatic controlling mechanism, the text to be transcribed is read from tape $f$ by means of ducts, or openings, located in the top of tracker bar $g$, tape $f$ being advanced in step-by-step fashion by means of ratchet 67, 68, which is itself driven by an eccentric 66 affixed to the shaft of rotatable element, or elongated cam, 60. The information read from tape $f$ is conveyed from the openings in the top of tracker bar $g$ to a corresponding set of pneumatic actions $e$ by means of air-pipes, or conduits, $g^4$, only part of which are shown in FIG. 3 for clearness. As may be seen from FIG. 5, each action $e$ comprises a housing within which an upper chamber and a lower chamber are defined by a diaphragm $e^3$. The lower chamber is vented directly to ambient atmosphere, while the upper chamber $e^2$ is connected to one of the air-pipes, or conduits, $g^4$ and also to vacuum line $h^1$ which is constantly evacuated by vacuum pump $h$ (FIG. 3). Diaphragm $e^3$ (FIG. 5) is downwardly-biased by spring $e^5$, and pin, or interponent, $e^4$ is affixed to diaphragm $e^3$ in such manner as to be retracted when diaphragm $e^3$ is downwardly-biased by spring $e^5$. Taking into consideration that, when a given character perforated into tape $f$ is located in juxtaposition to the openings in the top of tracker bar $g$, a unique combination of perforations and web portions renders a corresponding combination of conduits $g^4$ open to ambient atmosphere, or substantially sealed therefrom, examination of FIG. 5 will show that a web portion, or imperforation, located at a particular opening in the top of tracker bar $g$, will result in interponent $e^4$ of the corresponding action $e$ being raised, while a perforation being located at a particular opening in the top of tracker bar $g$ will result in interponent $e^4$ of the corresponding action $e$ being lowered. Thus, it may be seen that for each unique combination of perforations and imperforations in tape $f$, corresponding to a particular character, located in registration with the openings in the top of tracker bar $g$, a corresponding unique combination of interponents $e^4$ will be raised or lowered.

As further illustrated in FIG. 3, a plurality of longitudinally slidable controller-bars, or permutation bars $d$ are provided, each permutation bar $d$ corresponding to one interponent $e^4$, and being provided in its lower edge with a notch adapted to coact therewith. Each permutation bar $d$ is rightwardly-biased by a spring 48. As described in detail in Buckley, vane 57 (FIG. 3) is rocked counter-clockwise once during each rotation of elongated cam 60 by a spring 65 normally urging the vane to rock counter-clockwise, when abutment arm, or cam follower, 57$^a$ contacts the then downwardly-located eccentric face 61$^a$ of elongated cam 60 (i.e., the low portion of eccentric 60). When vane 57 is thus rocked substantially fully counter-clockwise, all of the permutation bars $d$ are forced to their leftward, or retracted, position against the force of springs 48. In this leftward position of permutation bars $d$ the notches adapted to coact with interponents $e^4$ are located in such position as to allow the interponents to readily pass into and out of them (see FIG. 6a). At the same time, a character of tape $f$ is located at the reading openings in the top of tracker bar $g$. As explained above, the interponents $e^4$ are raised or lowered in a unique combination corresponding to the unique character-representing combination of perforations and imperforations located at the openings in the top of tracker bar $g$. When, upon further rotation of elongated cams 60, cam follower 57$^a$ is rocked, and vane 57 rocked clockwise, permutation bars $d$ will be released from their retracted, or locked, position. At this time, those permutation bars whose corresponding interponents $e^4$ were lowered by the presence of a corresponding perforation in tape $f$, will slide rightwardly under the influence of associated spring 48 until stopped by the right-hand permutation support bar 46 (FIGS. 6a through 9a), while those permutation bars $d$ whose corresponding interponents $e^4$ were raised by the presence of corresponding imperforations in tape $f$ will slide rightwardly under the influence of associated springs 48 only so far as to be stopped by their interponents.

Thus, it may be seen that each unique character read from the tape $f$ will result, when it is being read, in a corresponding unique permutated arrangement of permutation bars $d$, those permutation bars corresponding to perforations being fully rightwardly shifted, and those permutation bars corresponding to imperforations being retained substantially in their leftward, or retracted, position.

As shown in detail in Buckley, the upper edge of each permutation bar $d$ is provided with a unique arrangement of notches, these notches being configured in the manner now well-known to those skilled in the art so that only one set of notches extending transversely of all of bars $d$ is aligned for any permutated arrangement of bars $d$ produced as described above. Thus, it may be seen that the presence of a given character of tape $f$ at the reading openings in tracker bar $g$ results in a corresponding transverse alignment of the notches located in the upper edges of bars $d$, and only one such transverse alignment.

As shown in FIGS. 3 and 6 through 9a, a lever, or sensor, $k$ is provided for coaction with each such transverse alignment of notches in the tops of permutation bars $d$. The sensors $k$ are all fulcrumed upon fulcrum bar $k^1$ (FIG. 6). Each sensor $k$ rests at its end opposite fulcrum bar $k^1$ upon longitudinal cam 60, and is spring-biased to ride upon longitudinal cam 60 by a sensor spring 56 (FIG. 6). Each sensor $k$ is equipped with a key link $k^2$ by means of which the sensor, when it moves downwardly into a corresponding transverse alignment of notches in permutation bars $d$, depresses corresponding key $b$ sufficiently to actuate the corresponding shifting device $s$, thereby causing corresponding type bar $b^1$ to print.

As also shown in FIG. 3, power to rotate elongated cam 60 is derived from worm 62 and gear 63. In Buckley this worm and gear drive cam 60 at a ratio of 2 to 1 relative to power roll 23. It is a characteristic feature of the present invention, however, that the ratio of this worm and gear is substantially increased; to the degree that, while power roll 23 rotates at a cyclic rate which may be chosen for minimizing wear of the power roll and shifting devices, uniformity of impression, etc., cam 60 rotates at a rate at which, in the absence of malfunction averting means, adjacent type bars would interfere, or repeated actuations of the same key would fail to print on the second actuation, or both. That is, according to the invention, power roll 23 may be operated at the same cyclic rate at which it is operated in the Buckley device, while the tape reader and the translator (i.e., permutation bars $d$, sensors $k$, etc.) are operated at a potentially malfunction producing transcribing rate except when the malfunction averting means is in operation.

From the above brief description the manner in which the automatic control mechanism of Buckley functions to cause the type bars corresponding to characters perforated into tape $f$ to print may be understood sufficiently to clearly comprehend the following description of the manner in which a particular embodiment of the instant invention is applied to the typewriter of Buckley. It will be understood by those skilled in the art that the typewriter of Buckley is selected merely as a simple, exemplary form for convenience in description of an embodiment of the instant invention, the instant invention being in no wise limited to application to a typewriter of the Buckley type, nor to the particular embodiment described herein as specially adapted for coaction with the Buckley typewriter. Further, the instant invention is not limited to devices employing perforated paper tape; such other copy media as cards, discs, bands, rolls, or tape, which are edge-punched, or magnetically, or optically, imprinted or inscribed being also suitable.

Reference is now had to FIGS. 6 through 9a which show certain modifications, and additions to, the Buckley typewriter constituting part of the embodiment of the instant invention shown and described herein.

Particularly, FIGS. 6 through 9 illustrate the relative angular position of elongated cam 60 and sensor reset cam 209 about their respective axes. As may be seen by comparison of the relative orientation of elongated cam 60 and sensor reset cam 209 in FIGS. 6, 7, 8, and 9, successively, the minimum radius of elongated cam 60 is maintained codirectional with the maximum radius of sensor reset cam 209. For instance, in FIG. 6 the minimum radius of elongated cam 60 is oriented directly downward, and the maximum radius of sensor reset cam 209 is also oriented directly downward. Similarly, in FIG. 7 the minimum radius of elongated cam 60 is directed horizontally to the right, and the maximum radius of sensor reset cam 209 is also directed horizontally to the right. It can be seen by inspection that the minimum radius of elongated cam 60 and the maximum radius of sensor reset cam 209 are codirectional in FIGS. 8 and 9. This codirectional relationship of the minimum radius of elongated cam 60 and the maximum radius of sensor reset cam 209 is maintained substantially constant at every orientation of these cams by constraining cam shaft 210, upon which cam 209 is mounted, to turn in synchronism with the rotation of elongated cam 60. This synchronized rotation, whereby the minor radius of elongated cam 60 and the major radius of sensor reset cam 209 are constantly maintained codirectional, may be accomplished by many expedients well-known to those skilled in the art, which will not be described here for the sake of clearness and brevity.

FIGS. 6 through 9 also show a small lug 223 on the lower, rear edge of sensors $k$, which lug is not found in the original Buckley typewriter. The purpose for this lug is set out in full hereinbelow.

Backbar hinge 208 and its function are explained in detail hereinbelow.

Backbar latch 203, the top end of which is shown in FIGS. 6 through 9, and its operation, are explained in detail hereinbelow.

FIG. 10 shows some of the principal parts of the embodiment of the instant invention shown and described herein as applied to the typewriter of Buckley. The changes in the typewriter of Buckley affected in the application of the instant invention thereto may be seen by comparison of the right-hand portion of FIG. 2 with FIG. 10.

As noted in FIG. 10, two of the principal subassemblies of the instant embodiment are shown therein, viz., the previous character memory, or memory, $mm$ and the stroke suppressor, or suppressor, $ss$. Also shown in FIG.

10 are certain switches which constitute part of another major subassembly of the instant embodiment, viz., the character comparator, or comparator, cc which is shown in FIG. 16 and described in connection therewith.

Suppressor ss comprises a horizontal bar member 207 which corresponds to the horizontal planar portion of the L-shaped frame member to which fulcrum bar $k^1$ is affixed in the typewriter of Buckley. Horizontal member, or backbar, 207 of FIG. 10, however, is hinged to the bar upon which fulcrum bar $k^1$ is affixed by means of longitudinal hinge 208, which may, for instance, be a hinge of the type generally known as a "piano hinge." Thus, backbar 207 may be pivoted above its right-hand edge.

As may also be seen in FIG. 10, the sensor springs 56 associated with each sensor $k$ are affixed at their lower ends to the left-hand portion of backbar 207.

When the plane of backbar 207 is horizontal, seensor springs 56 are stressed to the same extent to which springs 56 of the Buckley typewriter are stressed, and, thus, sensors $k$ will be drawn downward whenever a corresponding transverse alignment of notches in permutation bars $d$ occurs with sufficient force to actuate the corresponding type bar $b$ and cause printing to take place.

When, however, backbar 207 is pivoted so that its left side is higher than its right side (as seen in FIG. 10), then sensor springs 56 are substantially unstressed and insufficient downward force is exerted upon sensors $k$ to cause actuation of the keys $b$. As will be apparent to those skilled in the art, more positive suppression of automatically-controlled key operation may be provided by, say, providing upward spring bias upon backbar 207 by means of leaf springs mounted upon abutment channel 206. Such matters of ordinary skill will not be discussed here, however.

Put briefly, backbar 207 may be maintained with its plane horizontal, thereby stressing spring 56 and enabling keystrokes to take place under automatic control, or the left-hand edge of backbar 207 may be allowed to rise (rocked clockwise about its pivot 208), thereby suppressing keystrokes which would otherwise take place under control of transversely aligned sets of notches in the tops of permutation bars $d$.

Backbar latch 203 can then be seen to be capable of enabling or suppressing key actuation, by retaining or releasing backbar 207, respectively.

Backbar latch 203 is pivotally mounted by any suitable means, such as a stud 204, to the main frame of the typewriter and is operated into its keystroke enabling, or keystroke suppressing, position by the absence or presence of current in solenoid 201, respectively. That is, current in solenoid 201 will advance the plunger 202 of solenoid 201 to the right, thereby rocking backbar latch 203 (counter-clockwise as seen in FIG. 10), and releasing backbar 207, which, in turn, relaxes springs 56 sufficiently to suppress type bar actuating strokes of the keys $b$.

On the other hand, in the absence of current in coil 201, a spring 205 urges the lower end of backbar latch 203 leftwardly (as seen in FIG. 10), thereby retaining backbar 207 in its substantially horizontal position, and enabling printing whenever a sensor $k$ drops into a transverse alignment of notches in the upper edges of permutation bar $d$.

In the above description of the enabling of printing by the absence of current in solenoid 201, it was assumed that backbar 207 was automatically rotated upon hinge 208 sufficiently far to cause its left-hand edge to engage backbar latch 203, and that this resetting action takes place during every cycle of longitudinal cam 60, and at such time that the action of backbar latch 203 amounts to a meaningful choice (i.e., print, or suppress printing). This automatic resetting action is brought about in the instant embodiment by means of sensor reset cam 209. Sensor reset cam 209, as it passes through the position wherein its maximum radius is directed downwardly, forces backbar 207 downwardly into its horizontal position, thereby causing backbar latch 203 to lock backbar 207 into its horizontal position until such time as current passes through solenoid 201 and releases backbar 207. Thus, since, in the manner described hereinbelow, current is only passed through solenoid 201 when the detection of a potential malfunction indicates that a keystroke should be deleted, or suppressed, it may be seen that subassembly ss acts as the means for suppressing the keystroke function, or transiently decreasing the rate of operation of the typewriting means including keys, type bars, type drive means, etc., whenever a potential malfunction is detected.

It has already been explained that eccentric 209 operates synchronously, but in opposite phase, with elongated cam 60. Thus it is apparent that the backbar is moved to its latched, or keystroke enabling position, simultaneously with the lifting of the sensors $k$ to their inoperative position by the elongated cam 60 (see FIG. 6).

An additional major subassembly of the instant embodiment which is shown in FIG. 10 is the previous character memory, or memory, mm.

Memory mm comprises, generally, a plurality of memory blades, or members, 230, one blade being provided to coact with each sensor $k$; a memory latch, or detent, 238; a memory clearing solenoid, or power operator, 242; and certain springs, rods, pivots, and the like, which coact with the blades, clearing solenoid, and latch to retain an indication at the time any sensor of the key previously depressed is actuated.

FIG. 12 shows one of the memory blades 230 in detail. As may be seen by reference to FIG. 11, one blade 230 is provided to coact with each sensor $k$, each blade and its sensor being maintained substantially coplanar, the blade being located directly below the sensor as shown in FIG. 10. Each blade may, for instance, be comprised of a thin strip of rigid metal having the configuration shown in FIG. 12, though other materials and metals are not excluded from consideration. The flat, rigid stock from which blade 230 is composed may, for instance, be of approximately the same thickness as the corresponding sensor $k$.

Along the center line of blade 230 are located two longitudinally-directed slots 247, 248. By means of these slots, blades 230 are maintained vertical and located directly below the corresponding sensors $k$. Rod 245 passes through the slot 247 located in the upper end of each blade 230, while rod 246 passes through the lower slot 248 in each blade 230. Spacing between the blades 230 along the length of rods 245 and 246 is maintained by spacers 250; these spacers being of such length, and so affixed to rods 245 and 246 as to maintain a blade 230 directly beneath each sensor $k$. Rods 245 and 246 bearing the assembly comprising blades 230 and spacers 250 are affixed to the main body portion of the typewriter to which the invention is applied at such locations as to maintain the blades slidable along their vertical axes, and to, at the same time, enable each blade to bear upon the lower edge of its corresponding sensor $k$ when its corresponding sensor is maintained in its most upwardly-located position by virtue of elongated cam 60 being disposed as shown in FIG. 6. The length of slots 247 and 248 is selected such that any blade may be downwardly depressed by its corresponding sensor, against the action of its corresponding blade return spring 234, far enough to permit its corresponding sensor $k$ to assume its lowest, key-actuating position, as shown in FIG. 8. As will be apparent to those skilled in the art, one blade return spring 234 is provided to coact with each blade 230. The location in the device of the invention of blade return springs 234 is illustrated in FIG. 10, it being understood that means for fastening springs 234 in the illustrated position may be provided within the compass of ordinary skill in the art.

Another characteristic feature of each of the blades 230 shown in FIG. 12 is the memory lug 237, which is adapted to coact with the memory latch 238 in the manner illustrated in FIGS. 10 and 11. As will be apparent to those skilled in the art, upon consulting FIGS. 10 and 11 and reading the accompanying text, the memory lug 237, which forms a part of any particular blade 230, is configured and located that, when the particular blade is pressed downwardly by corresponding sensor $k$ passing from its uppermost position to its lowermost position, lug 237 will rock memory latch 238 about pivot 239 against the action of spring 240. Such rocking of latch 238 will have two effects, viz., locking the particular blade 230 in its depressed condition after the return upward of corresponding sensor $k$, due to lug 37 being locked below latch 238, and releasing any other blade at the time at which bar 238.6 (FIG. 11) of latch 238 is maximally deflected to the right in FIG. 10, the lug of said other blade then escaping past bar 238.6, since the sensor $k$ corresponding to said other blade is upwardly located, permitting said other blade to rise freely. As will further be apparent to those skilled in the art, memory $mm$ is "cleared," i.e., all of the blades 230 are permitted to rise to their upward positions, whenever, all of the sensors $k$ being in their upward positions, clearing solenoid 242 is energized by passing current through it, thereby rocking latch 238 such that bar 238.6 is free of all of the lugs 237 sufficiently long for springs 234 to press all of the blades 230 to their uppermost locations. Alternative means which may be adopted in the place of lugs 237 so that the above-described memory setting and clearing actions may be accomplished without manufacturing blades 230, rods 245 and 246, lugs 237, etc., to a high degree of precision, will occur to those having ordinary skill in the art, and need not be discussed here.

An additional characteristic feature of blade 230, as shown in FIG. 12, is recess 249. As shown in FIG. 10, recess 249 is adapted to coact with actuator wheel 233 of normally open miniature snap-action switch 231. This switch 231 is closed upon downward movement of blade 230. It should be noted at this point that all three miniature snap-action switches shown herein, viz, 220, 224, and 231, are of the normally open, or closed-when-actuated variety. Of course, as shown in FIG. 11, each blade 230 has coacting therewith a switch 231, and each sensor $k$ has coacting therewith a switch 220; while, on the other hand, there is but one master switch 224 which coacts with elongated cam 60. Put differently, switches 220 and 231 may be thought of as grouped in pairs, each pair coacting with a co-operating sensor $k$ and blade 230. The contour, or configuration, of recess 249 is so designed that actuator wheel 233 of switch 231 is not sufficiently deflected to close switch 231 until after switch 220 has been closed by downwardly-moving sensor lug 223 and switch 220 opens again upon actuator wheel 222 being released to its normal spring-biased position by the passage of sensor lug 223 beyond it in the downward direction as seen in FIG. 10. This configuration of recess 249 whereby switch 231 is not closed until after lug 223 has passed by actuator wheel 222 in its downward direction is characteristic of every blade 230 employed herein.

Another component of memory $mm$, which is shown in FIGS. 10 and 11, in the memory latch 238. Latch 238 comprises four rods, or bars, 238.1, 238.2, 238.3 and 238.6, which extend longitudinally of the typewriter to which the instant embodiment of the invention is applied. Bars 238.1, 238.2, 238.3 and 238.6 are joined into a single, integral assembly by means of arms 238.4 and 238.5, these arms being employed in pairs, the members of these pairs being located at opposite ends of said bars. That is, one arm 238.4 extends between bars 238.1 and 238.2 at the left-hand end of latch 238, as shown in FIG. 11, while a second arm 238.4 extends between bars 238.1 and 238.2 at the right-hand end of latch 238 (not shown). Similarly, an arm 238.5 is secured to arms 238.2, 238.3, and 238.6 at the left-hand end of latch 238, as shown in FIG. 11, while a second arm 238.5 extends between bars 238.2, 238.3, and 238.6 at the right-hand end of latch 238 (not shown). Arms 238.4 and 238.5 are mutually angulated in the manner shown in FIG. 10, and may, as a matter of choice, be fabricated in one piece, in the manner of a bellcrank, or composed of two separate arms individually fabricated and subsequently joined. In any event, it will be understood that bars 238.1, 238.2, 238.3, and 238.6, and arms 238.4 and 238.5 together form a rigid assembly known as latch 238. When installed in the embodiment of the invention described herein, latch 238, as a whole, is rockable about the axis of bar 238.2, the ends of bar 238.2 being, in a preferred embodiment, extended to form pivots 239, one pivot 239 being located at either end of latch 238. These pivots 239 are then journaled in bearings (not shown) which serve to maintain latch 238 in rockable, co-operative relationship with lugs 237 of blades 230, as shown in FIGS. 10 and 11. In this rockable, co-operative relationship, bar 238.6 will normally, as urged by spring 240, be pressed leftwardly and upwardly as shown in FIG. 10, and will resiliently bear against the lower faces of lugs 237, thereby serving to constrain in its depressed position any blade 230 which has been sufficiently depressed by corresponding sensor $k$ that its lug 237 is located below bar 238.6 in its normal, spring-biased position. The end of spring 240 opposite that which engages bar 238.1 is fastened to a fixed point of the frame of the typewriter by any suitable means, such as, for example, rod 241. It will be understood that alternative types of spring may be substituted for coil spring 240, and that, for reasons of smooth operation, etc., it may be found desirable by those skilled in the art to employ an additional spring 240 at the opposite end of bar 238.1 having its other end similarly affixed to the frame of the typewriter by the same, or an additional, means 241. It should also be understood that latch 238 is so journaled, and of sufficient strength, rigidity, etc., that bar 238.6 firmly engages all of the blades 230. Further, it will be understood by those having ordinary skill in the art that latch 238 is sufficiently rockable to clear the uppermost, or right-hand, points of lugs 237, such that the full depression of any one blade 230 will cause bar 238.6 to rock sufficiently to the right (counter-clockwise as seen in FIG. 10) to release any other blade 230 at that time locked down by coaction between its lug 237 and bar 238.6.

An additional component of memory $mm$ is the memory clearing solenoid 242. It will be understood that a single solenoid 242 may be employed, or, for smoothness of operation, etc., a clearing solenoid 242 may be provided at both ends of latch 238, and coact therewith. Clearing solenoid 242 is pivotably affixed to the frame of the typewriter by suitable means 243, the details of which need not be discussed here, since they are within the scope of one having ordinary skill in the art. The armature 244 of solenoid 242 is pivoted to bar 238.3 of latch 238, as by slot 251. Thus, solenoid 242 is adapted to rock rigid latch 238 (in a counter-clockwise direction as seen in FIG. 10) when energized. It is apparent that rocking latch 238 under the control of solenoid 242 results in all of the lugs 237 of every memory blade 230 escaping the latching action of bar 238.6, thus clearing memory $mm$. While a particular construction of latch 238 has been described directly hereinabove, it is not intended that this particular construction should be in any way limiting, it being possible, for instance, to substitute a single stamped metal member for latch 238, the stamped metal member consisting of a bail portion substituent for bar 238.6 and end members bent substantially perpendicular to said bail portion and equipped with pivot means corresponding to pivots 239, pivot means for engaging the armature 244 in place of bar 238.3, and means for engaging the upper end of spring, or springs, 240.

An additional component of memory $mm$ is a plurality of the blade return springs 234, one of which is associated with each blade 230, and urges its associated blade upward toward the sensor $k$ associated therewith.

An additional major subassembly of the instant embodiment is the character comparator, or comparator, $cc$, which is shown in FIGS. 10, 11, and 16.

Comparator $cc$ comprises, generally, a plurality of switches 220, the plurality of switches 231 already mentioned in connection with memory $mm$, a master cycle switch 224, and a plurality of diodes 300, all interconnected as shown in FIG. 16. The diodes and interconnections are shown schematically in FIG. 16, but are not shown elsewhere, since the location and mounting of the diodes and interconnections is a mere matter of choice, and not critical to the invention. While solenoids 201, 242, and 260 are schematically illustrated in FIG. 16, they are not generally thought of as being part of the comparator. Rather, solenoid 201 is considered part of the stroke suppressor $ss$, solenoid 242 is considered part of the previous character memory $mm$, and solenoid 260 is considered part of the tape arrester $aa$ (FIGS. 13, 14, and 15).

The operation of switches 220 may be seen from FIG. 10. In FIG. 10 elongated cam 60 is shown in its minimum radius upward position. The particular sensor $k$ shown in FIG. 10, however, is out of contact with the eccentric face of cam 60 because it is resting on the upper edges of four of the permutation bars $d$. Put differently, the sensor $k$ shown in FIG. 10 is not the one corresponding to the key currently selected for actuation. Thus, lug 223 of sensor $k$ is in a sensor-held-out position. Switch 220 is so mounted and arranged that it will be unactuated, or open, when its corresponding sensor $k$ is in a sensor-held-out position. It should be remembered at this point that, as shown in FIG. 11, there is a plurality of switches 220, each coacting with one sensor $k$. In order that any type bar be actuated in response to a character perforated in tape $f$, a full transverse alignment of notches in the upper edges of permutation bars $d$ must be presented to a single sensor $k$, allowing this sensor to remain in contact with the eccentric surface of elongated cam 60 by reason of the downward urging of its associated spring 56. Considering, now, the operation of sensor switch 220 in conjunction with a sensor which is presented with such a transverse alignment of notches in the tops of the permutation bars $d$, it will first be recognized that, in contrast with the sensor-held-out condition, lug 223 now descends far enough to deflect actuator wheel 222 sufficiently to close switch 220. As may be seen in FIG. 10, however, lug 223 is very narrow in the direction of its travel. For this reason, switch 220 will remain closed for but a small portion of the complete downward travel of lug 223. In fact, switch 220 will be closed by lug 223 substantially immediately after the selected sensor $k$ descends below the lowest sensor-held-out position, and will be reopened by lug 223 releasing actuator wheel 222 before sensor $k$ has descended sufficiently to close corresponding switch 231 by means of associated blade 230, and before sensor $k$ has descended sufficiently to actuate its corresponding shifting device, or type bar drive means, $s$. That is, switch 220 is first closed and then reopened during the descent of lug 223, the reopening of switch 220 taking place before corresponding switch 231 is closed, and also before the corresponding type bar is driven. The use of well-constructed subminiature snap-action switches to accomplish such high-precision timed circuit closing functions is well-known to those skilled in the art, and need not be further discussed here. Alternative switch means, such as those used extensively in telephone systems, may be alternatively employed as a matter of mere choice of those having ordinary skill in the art without the exercise of invention.

As will be apparent to those having ordinary skill in the art, switch 220 will also be briefly closed during the ascent of lug 223. During this brief closure of switch 220, when lug 223 is ascending, however, the normally open master cycle switch 224 will be open, as may be seen from FIG. 10, keeping in mind that elongated cam 60 rotates in a counter-clockwise direction as seen in FIG. 10. Since, as seen in FIG. 16, master switch 224 completely opens the actuating circuit through solenoids 201, 242, and 260, no current can pass through these solenoids when master switch 224 is open, whether one of the switches 220 is closed, or not. Thus, the closing of switch 220, upon the ascent of lug 223 of the selected sensor $k$ is nullified insofar as carrying out any action by means of the three solenoids is concerned.

From the above it may be seen that sensor switches 220 and master cycle switch 224, along with their associated actuating means, coact to prime the solenoid actuating circuit for operation by a preclosed switch 231 *only* at the time during each rotation of the elongated cam 60 when a selected sensor $k$ has begun to descend, the type bar corresponding to the selected sensor has not yet been actuated, and the memory blade 230 corresponding to the selected sensor has not yet been depressed sufficiently far to close its corresponding memory switch 231. As will be apparent from FIG. 16, at least one switch 220 must be closed in order to complete the solenoid actuating circuit (i.e., the circuit from the power supply terminal indicated by "+" to ground). As explained above, only one switch 220 can be closed at any given time, since only one complete transverse alignment of notches in the upper edges of permutation bars $d$ is possible. Thus, in any given cycle of elongated cam 60 during which a sensor descends, a circuit will be completed from ground through master switch 224, latch releasing solenoid 201, memory clearing solenoid 242, and pawl arresting solenoid, 260, and one switch 220 during a brief primed interval extending from substantially the time at which the sensor commences its descent and substantially the time at which the corresponding type bar would otherwise have been actuated, and the corresponding memory switch would otherwise have been closed. Except during this brief primed interval will occur during the *ascent* of any sensor to the lower terminals, or hubs, of switches 220, as seen in FIG. 16, will be open, thus making energization of solenoids 201, 242, and 260 impossible. Particularly, no primed interval will occur during the *ascent* of any sensor $k$, since, at that time, master switch 224 will be open, as may be seen from FIG. 10, bearing in mind that elongated cam 60 rotates in a counter-clockwise direction as seen in FIG. 10. In other words, switch 224 will be closed during that time that cam 60 is positioned to allow sensor $k$ to descend (FIG. 8); and is held open during the time that the cam 60 is restoring the sensor $k$ (FIG. 9).

As shown in FIGS. 10 and 11, a memory switch 231 coacts with each memory blade 230. When any memory blade 230 is locked in its downward position by memory latch 238, its associated switch 231 is closed. During any primed interval, as described above, however, only one switch 231 can be closed, since no blade 230 is sufficiently depressed to close its corresponding switch 231 until after the corresponding primed interval. Thus, the only switch 231 which can be closed during any primed interval is the switch corresponding to the blade which was depressed, and latched, when the immediately previously selected sensor descended into the transverse alignment of notches extending across permutation bars $d$. It may thus be seen that any possible momentary closing of two switches 231 simultaneously, while one blade 230 is being latched, and another blade 230 is being released, cannot have any actuating effect upon the solenoids because the switch corresponding to the descending blade is not closed until after the primed interval. Thus, any switch 231 which serves, along with master switch 224 and a sensor switch 220, to close an actuating circuit in response to descent of a sensor $k$ must be the switch 231 corresponding to the immediately previously selected sensor $k$.

In view of the above, the function of the diodes 300 shown in FIG. 16 may now be understood.

As any particular sensor $k$ commences its descent, a primed interval occurs during which a circuit is completed from ground to the lower hub of the switch 220 associated with that sensor. Each one of such circuits includes solenoids 201, 242, and 260. As may be seen from FIG. 16, the lower hub of a switch 220 which is closed to form part of such a partial circuit need only be connected directly to the power supply (indicated by "+") to actuate the solenoids, and thus abort the stroke of the type bar which would otherwise follow the descent of the sensor, arrest the progress of the tape which would otherwise follow the descent of the sensor, and clear the memory. Since the lower hub of switch 220 in such a partial circuit is prepared to accomplish these three functions upon merely connecting it with the "+" terminal of the power supply, the hub at the end of such a partial circuit remote from ground will hereinafter be said to be "primed." It will be clear to those skilled in the art, each pair of switches 220 and 231, found in vertical alignment in FIG. 16, co-operate with the same sensor $k$. Further, adjacent vertically aligned pairs of switches 220 and 231, as shown in FIG. 16, correspond to adjacent sensors as found in the typewriter to which the instant invention is applied. Thus, the vertically disposed pair of switches labelled $X_0$ in FIG. 16 coact with a particular sensor, etc., in the typewriter to which the instant invention is applied, while the vertically disposed pair of switches labelled $X_L$ in FIG. 16 coact with the sensor, etc., located directly to the left of said particular sensor, and the vertically disposed pair of switches labelled $X_R$ in FIG. 16 coact with the sensor, etc., located directly to the right of said particular sensor in the typewriter to which the invention is applied.

For convenience in subsequent discussion a decimal number is appended to the designations of certain diodes, e.g., the diode directly connected between the two switches in the $X_0$ array is designated 300.1.

Also, the convention will be employed herein of designating the lower hubs 400 of switches 220 according to the array in which they are located. Thus, the lower hub of switch 220 in the $X_0$ array will be designated 400–O, the lower hub of switch 220 of the $X_L$ array will be designated 400–L, etc.

Similarly, the upper hub of switch 231 in the $X_0$ array will be designated 401–O, the upper hub of switch 231 in the $X_L$ array will be designated 401–L, etc.

Following the same principles, hubs in the array next rightward of $X_R$, i.e., hubs in the array adjacent-but-one to array $X_0$, will be given the hyphenated suffix R1. Thus, the right-hand hub 400 shown in FIG. 16 will be designated 400–R1. Also, the right-hand hub 401 shown in FIG. 16 will be designated 401–R1, while the left-hand hub 401 shown in FIG. 16 will be designated 401–L1. Extending this notation, it will be recognized by those skilled in the art that the hub next to the right of the rightmost hub 400 shown in FIG. 16 will be designated 400–R2, while the hub 401 of the same array will be designated 401–R2.

A similar notation is adopted for convenient identification of particular switches 220 or 231. For instances, switch 220 of the $X_0$ array will be designated 220–O, while switch 220 of the rightmost array in FIG. 16 will be designated 220–R1. Similarly, switch 231 of the leftmost array of FIG. 16 will be designated 231–L1, and switch 231 of the array next to the right of the rightmost array shown in FIG. 16 will be designated 231–R2.

It should be noted that while $X_0$ is used in FIG. 16 to designate the third array from the left-hand end of the group of arrays employed in carrying out the instant invention, it is not intended to indicate by FIG. 16 that $X_0$ designates any particular two-switch array in the comparator according to the present embodiment. Rather, the expression $X_0$ is used to designate the particular array which, during a particular primed interval, has its hub 400 (i.e., 400–O) primed. Thus, the particular location of the designation $X_0$ in FIG. 16 merely indicates that, during a particular primed interval, being considered in connection with FIG. 16, hub 400 (i.e, 400–O) of the $X_0$ array is primed.

Having considered certain special notations employed in conjunction with the diode network of FIG. 16, I shall now proceed to consider the operation of the diode network of FIG. 16 when hub 400–O is primed. As explained hereinabove, hub 400–O is primed when the corresponding sensor $k$ (designated $k$–O by analogy to the notation explained above) has rocked about its fulcrum bar $k^1$ beyond its lowest sensor-held-out position, but has not yet rocked sufficiently far to close memory switch 231–O, or to release any memory blades 230 by actuating latch 238. The primed intervals during which $k$–O is descending will hereinafter be called "P–O" intervals.

In the following discussion it will be remembered that, generally, $k$–O may be any one of the sensors $k$, and $X_0$ will then be the corresponding arry of switches 220 and 231, etc.

During any P–O interval, except when the automatic malfunction suppression action of the instant embodiment has just previously taken place, one switch 231 will be held closed by its corresponding blade 230, this one switch corresponding to the type bar immediately previously actuated. Since, in general, there is no necessary relationship between the selection of a particular type bar and the selection of the immediately previously actuated type bar, it follows that any combination of primed hub 400–O and closed switch 231 may be found during extended transcription of general written material.

Insofar as the invocation of the automatic malfunction suppression operation of the instant embodiment is concerned, however, these combinations may be usefully classified as follows:

NS, or combinations corresponding to pairs of type bars sufficiently remote from each other in the type basket that the malfunction suppression operation need not be invoked when they are successively actuated at such a speed of typewriter operation that type bars more closely adjacent in the type basket will not function if the malfunction suppression operation is not invoked;

RP, or combinations corresponding to successive actuation of the same type bar;

J, or combinations corresponding to the successive actuation of type bars lying immediately adjacent each other in the type basket;

RJ, or J combinations in which the first type bar actuated lies in the type basket to the right of the second type bar actuated;

LJ, or J combinations in which the first type bar actuated lies in the type basket to the left of the second type bar actuated;

JB1, or combinations corresponding to the successive actuation of type bars having but one type bar located between them in the type basket, i.e., type bars which are adjacent-but-one in the type basket. Adjacent-but-two combinations are analogously designated JB2, etc. These combinations can generally be referred to as "adjacent-but-N";

RJB1, or JB1 combinations in which the first type bar actuated lies in the type basket to the right of the second type bar actuated;

LJB1, or JB1 combinations in which the type bar first actuated lies in the basket to the left of the type bar actuated second;

RJB2, LJB3, etc., may be understood by analogy to the above definitions.

In all of these definitions it is to be understood that the type basket is viewed from the normal, or operator's, position.

Returning now to FIG. 16, it may be seen that the particular diode network employed in the comparator of the particular embodiment of the instant invention shown and described herein functions to energize solenoids 201, 242, and 260, i.e., to avert malfunction, clear memory *mm*, and arrest tape *f*, in response to RP and J combinations, but *not* in response to JB1, JB2, etc., combinations.

Thus, if an RP combination occurs, $X_0$ being located as shown in FIG. 16, an actuating circuit will be completed through diode 300.1, and the solenoids will be energized.

Also, if a J combination occurs, $X_0$ being located as shown in FIG. 16, then the actuating circuit will be closed through either diode 300.4 or diode 300.5, and the solenoids will be energized.

However, if a JB1 combination occurs, $X_0$ being located as shown in FIG. 16, then no actuating circuit will be completed, and the solenoids will not be energized. This may be seen by considering the JB1 combination including switch 220–O and switch 231–L1. Since these two switches are closed, hub 400–O is primed, and hub 401–L1 is directly connected to the supply terminal "+." Only two connections lead from terminal 401–L1, viz., the connection including diode 300.9 and the connection including diode 300.7. Diode 300.9 is correctly polarized for flow of current in the actuating circuit. However, diode 300.9 is connected in opposition to diode 300.8, thus blocking the flow of solenoid-energizing current through the series combination of these two diodes. Since only switch 220–O of the bank of switches 220 is closed, the only connection to the cathode of diode 300.9 besides bucking diode 300.8, is an open circuit. Even if diode 300.9 were not located in the leftmost array, the only other connection to its cathode would be through a second bucking diode. Therefore, no actuating current can flow from hub 401–L1 through the solenoids. Similarly, the cathode of diode 300.7 is directly connected to a hub 400–L, the only paths from which pass through either a short circuit (open switch 220–L), or a bucking diode ( 300.2, 300.6). Thus, it may be seen that the diode network of the instant embodiment blocks actuating current flow for all combinations except RP or J combinations.

It is to be understood that the instant invention is not limited to the employment of the particular electrical comparator *cc* shown and described herein, nor, irrespective of the type of comparator employed, to a comparator which actuates the malfunction suppression means in response only to the particular combination of RB and J conditions. In fact, one preferred embodiment of the instant invention is one in which only RP conditions are detected, and the malfunction suppression means actuated in response thereto. This particular embodiment is useful in connection with a large group of art known as automatic motorized typewriters in which the type bar return action is sufficiently rapid that, at certain intermediate speeds of typewriter operation, the only malfunction which occurs, absent malfunction suppression means, is the failure to print the second character of double character pairs by reason of the fact that the type bar drive means by which the type bars are powered from the power roll, or equivalent power apparatus, are not reset sufficiently rapidly. As will be apparent to those skilled in the art, upon reading the instant specification and viewing the instant drawings, the diode network of FIG. 16 may be adapted to invoke the malfunction suppression apparatus in the instant invention only upon the occurrence of RP conditions by removing all of the diodes and directly connecting each hub 400 to its hub 401 in each array.

Also, it will be apparent to those skilled in the art by what means the diode network shown in FIG. 16 may be extended in its scope to invoke the malfunction averting apparatus of the invention for JB1 combinations, viz., by connecting the anodes of two additional diodes to each hub 401, connecting the cathode of one of these additional diodes to the hub 400 adjacent-but-one to the right of the hub 400 in the same array, and connecting the cathode of the other additional diode to the hub 400 adjacent but one to the left of the hub 400 in the same array. Thus, the extent of adjacent type bars in the same basket which are protected from malfunction by invoking the operation of the malfunction averting means may be selected by one having ordinary skill in the art in accordance with the teachings of the instant specification and drawings. All such combinations, protecting adjacent type bars from malfunction to whatever number, are aspects of the instant invention. The invocation of the malfunction suppression action only in connection with RP combinations constitutes a particular separate and novel aspect of the instant invention.

An additional major subassembly of the instant embodiment is the tape arrester *aa*, shown in FIGS. 13 through 15.

Tape arrester *aa* functions to withdraw pawl 67 from ratchet wheel 68 (FIG. 3) for one stroke only of pawl 67 in response to energization of solenoid 260. Thus, the regular, step-by-step feed of tape *f*, resulting from the coaction of pawl 67 with ratchet wheel 68, is interrupted each time solenoid 260 is energized. At each such interruption the character-representing transverse row of perforations, then located in reading position upon tracker bar *g*, remains at the reading position until the next successive stroke of pawl 67, at which time, arrester *aa* having cleared itself, tape *f* is advanced by one inter-character space.

Arrester *aa* comprises, generally, a solenoid 260 and its armature 261, the retractor links 270 shown in detail in FIG. 15, and resetting dog 277, the operation of which is illustrated in FIG. 14.

Pawl 67, which is specially equipped with ear 278 (FIG. 14) for coaction with dog 277, passes through the lower portion of the retractor 270 (FIG. 15). More particularly, pawl 67 passes between side links 270 which are the principal members of the retractor, and passes above, or rests upon, the lower cross member 276 of the retractor.

The retractor is provided with pivots 271 which are journalled in bearings provided in two bearing blocks 273, one on either side of the retractor, these bearing blocks being affixed to the frame of the typewriter by means shown, for example, at 274 and 275 in FIG. 13. The bearing blocks 273, and, thus, the axis of pivots 271, are so located with respect to the normal position of pawl 67 as it rides ratchet wheel 68 that lower cross member 276 of the retractor holds pawl 67 slidably out of engagement with ratchet wheel 68 when the retractor is in the position shown in FIG. 13, i.e., the position corresponding to the engagement of ball detent 267 with recess 264 in armature 261. Additionally, the location of bearing blocks 273 is also chosen in such manner that, when the retractor is in the position corresponding to the engagement of ball detent 267 with recess 263, ratchet 67 rides ratchet wheel 68 in normal fashion, as in the unmodified typewriter of Buckley.

Thus, it may be seen that solenoid 260 is capable of drawing the retractor, or pawl retractor, from its inoperative position, i.e., the position in which ball detent 267 engages recess 263 and pawl 67 runs freely in its normal ratchet wheel-riding fashion, to its operative position, i.e., the position shown in FIG. 13 in which ball detent 267 engages recess 264, and lower cross member 276 of the retractor slidably supports pawl 67 and out of contact with ratchet wheel 68.

As will be apparent to those skilled in the art, solenoid 260 is provided with armature 261 which is, in turn, provided with a cross pin 262 adapted to engage the slots 272 in the upper end of side links 270 of the retractor. Armature 261 is further provided with two recesses 263 and 264 in its upper edge, and is slidably supported in a guide 265, the upper portion of guide 265 being provided with a bore in which is disposed ball detent 267, ball detent drive spring 268, and threaded member 269 fitted to guide 265 and adapted to confine spring 268, thereby pressing ball detent 267 resiliently downward and adapting it to engage one or the other of recesses 263 and 264. Additional stops, etc., may, of course, be provided to prevent overshooting of solenoid armature 261 in response to energization of solenoid coil 260, and the like. Such additional expedients, however, are within the scope of the oridinary mechanic in the art, and will not be described here.

As noted above, solenoid coil 260 is capable, by means of cross pin 262 and armataure 261, of rocking the retractor from its inoperative position to its operative position. Thus, since solenoid coil 260 is energized each time a possible malfunction is detected by comparator $cc$, the retractor is rocked to its operative position each time a potential malfunction is detected, thereby disengaging pawl 67 from ratchet wheel 68, and retaining tape $f$ in place so that the same character can be typed on a subsequent, effective cycle of operation of the automatic motorized typewriter control apparatus of the typewriter in which the present invention is embodied as shown and described herein.

However, as will be apparent to those having ordinary skill in the art, it is necessary that the pawl retractor be reset to its inoperative position after it has succeeded in arresting one, and only one, of the periodic advances of type $f$. Otherwise, the tape would remain fixed after a first energization of solenoid coil 260, and the typewriter equipped with the invention would merely print, over and over, the character corresponding to that transverse row of perforations of tape $f$ which was located at tracker bar $g$ when coil 260 was first energized.

Put differently, the pawl retractor must be arranged to be automtaically reset to its inoperative position before the advancing (i.e., toward the ratchet wheel) stroke of pawl 67 following the advancing stroke during which the pawl retractor is placed in its operative position by solenoid 260.

Spring-loaded dog 277 is provided to accomplish this function. As may be seen from FIG. 14, resetting dog 277 comprises blade 277.1 which is pivoted about cross member 277.2 and biased toward limit-setting cross member 277.3 by coil spring 277.4, coil spring 277.4 itself being maintained in biasing relationship with blade 277.1 by being confined between a suitable recess in blade 277.1 and suitable means co-operating with backstop cross member 277.5. It will be understood by those skilled in the art that the cross members 277.2, 277.3, and 277.5 not only serve to coact with blade 277.1, but also act as structural members to maintain the relationship and spacing of side links 270 defining the pawl retractor.

Resetting dog 277 may be seen to operate in the following manner: When solenoid 260 is energized, the pawl retractor is rocked into its operative position as shown in FIG. 13. This rocking of the pawl retractor into its operative position takes place during the advancing portion of the stroke of pawl 67, i.e., the portion during which the pawl is traveling toward ratchet wheel 68 (to the left in FIG. 14). As explained above, lower cross member 276 of the retractor maintains pawl 67 out of contact with ratchet wheel 68 on this advancing portion of the stroke of the pawl when the retractor 270 moves to its operative position. As can be seen in FIG. 14, pawl 67 moving in its advancing direction (leftwardly in FIG. 14), forces blade 277.1 aside against the action of spring 277.4, ear, 278 normally being located to the left of blade 277.1. As the pawl 67 reaches the extreme forward position the blade 277.1 drops behind ear 278, as shown in FIG. 14, and is then spring-pressed to abut to the right edge of ear 278. Thus, on the return portion of the stroke of pawl 67 (rightward in FIG. 14), ear 278 engages blade 277.1, pressing blade 277.1 against backstop cross member 277.3 and pulling the retractor back into its inoperative position. Ear 278 is, of course, so proportioned that it disengages from the lower edge of blade 277.1 at the time when the retractor is in its substantially vertical position, i.e., its inoperative position.

Thus, with reference to FIGS. 13 through 15, it may be seen that an efficient means is provided whereby, upon each energization of solenoid coil 260, pawl 67 is disengaged from ratchet wheel 68, but only for one stroke of pawl 67. It is to be understood that the particular arrester means $aa$ shown and described in these figures and the accompanying text is not a critical, or limiting, feature of the instant invention.

OPERATION

For a fuller understanding of the instant invention, and of the particular embodiment shown and described herein, the overall operation of the embodiment during the typewriting of the word "SWISS" will be described in detail, it being understood that the typewriting of this word in solid capitals is selected as an example merely for simplicity and convenience, automatic motorized typewriters modified according to the invention being capable of printing in capitals and lower case letters as indicated by suitable perforations in the perforated tape employed therewith.

Assuming that the initial "S" of the word "SWISS" has just been typewritten, it follows that the memory blade 230 associated with the type bar bearing the letter "S" is now locked down by latch 238.

Since a space was "typed" immediately before the initial "S" of the exemplary word "SWISS," comparator $cc$ has detected no potential malfunction, and pawl 67 advances tape $f$ in the normal manner.

The perforations now stationed at the reading location of tracker bar $g$ are those corresponding to the letter "W."

Responsive to these perforations, a transverse alignment of notches in the tops of permutation bars $d$ appears, and the sensor $k$ corresponding to the letter "W" starts to descend, closing the switch 220 corresponding to the letter "W" during the priming interval.

(For convenience, the sensor $k$ corresponding to the letter "W" will be referred to as "W"$k$, the switch 220 corresponding to the letter "W" will be referred to as switch "W"220, etc.)

However, as explained above, blade "S"230 is already locked down and, therefore, switch "S"231 is closed.

As may be seen from FIG. 6 of Buckley, the "S" and "W" keys of the Buckley typewriter are adjacent.

Thus, switch "W"220 primes an actuating circuit branch already conditionally closed by switch "S"231, and, since switch 224 is already closed (see FIG. 10), the three solenoids are energized.

These solenoids clear memory $mm$, arrest one advancing step of tape $f$, and release springs 56 by unlatching back bar 207, thus preventing sensor "W"$k$ from causing the "W" type bar to imprint. As explained hereinabove, back bar 207 is subsequently relatched and the pawl retractor is subsequently reset to its inoperative position, both of these events taking place before the eccentric portion of elongated cam 60 returns to the state of rotation at which it can permit a sensor to begin to descend.

Since the advance of tape $f$ was aborted, the perforations corresponding to the character "W" remain at the reading station of tracker bar $g$, and sensor "W"$k$ will again descend when the eccentric portion of elongated cam 60 commences to permit it to do so.

Upon this descent of sensor "W"$k$, however, blade "S"230 has already been released by the rocking of latch 238 by solenoid 242 and, consequently, switch "S"231 is open.

For this reason, no closed actuating circuit for the solenoids is formed, and the normal "W" print cycle takes place, including the locking down of blade "W"230.

Also, pawl 67, by the automatic resetting action of the pawl retractor described hereinabove in connection with FIG. 14, is free to engage ratchet wheel 68, and does so, advancing the tape f and locating the perforations corresponding to the letter "I" at the reading station of tracker bar g.

Responsive to the "I" perforations now at the reading station of tracker bar g, sensor "I"k begins to descend, closing switch "I"220.

However, switch "I"220 and switch "W"231 (held closed by blade "W"230) are *not* in the same actuation circuit (NS condition), and, thus, the solenoids are not actuated, and the normal "I" print cycle takes place, including the locking down of blade "I"230 and the release of blade "W"230.

Since "I" and "S" are non-adjacent in the Buckley typewriter, the second "S" in the exemplary word prints normally, including the locking down of blade "S"230.

The tape advances till the perforations corresponding to the third "S" in the exemplary word are located at the reading station of tracker bar g.

Responsive to these perforations, sensor "S"k begins to descend, closing switch "S"220.

At the priming interval, both switches "S"220 and "S"231 are closed, thus aborting the print cycle, arresting the tape, and clearing the memory, as described above.

On the next revolution of elongated cam 60, the "S" perforations remain "on station," and the third "S" of the exemplary word prints in the normal manner.

Thus, if the same two letters, or letters adjacent in the type basket, are to be type successively, for example, the letters "SS" or "SW," respectively, in the word "SWISS," the typing of the first "S" will be accomplished by descent of sensor k which will momentarily close switch 220. Because the switch 231 in that or the adjacent order was not previously closed, no circuit will be completed for aborting tape advancement, clearing the memory mm, or operating the stroke suppressor ss. Upon further descent of sensor k, the blade 230 will operate to close switch 231, but again a circuit will not be completed for operation of the several solenoids, because switch 220 is now opened. Upon restoration of sensor k by means of the cam 60, no circuit will be established even though switch 231 is closed and switch 220 is momentarily closed, since the master switch 224 will now be opened by rotation of cam 60. However, during descent of the sensor k for effecting typing of the next letter, "S" or "W" as the case may be, it can be seen that master switch 224 will be closed by cam 60, switch 231 remains closed as a result of the previous descent of sensor k for the letter "S," and descent of sensor k will close the switch 220 momentarily, thereby establishing a circuit through switch 231, switch 220 and switch 224 for energizing the solenoids 242, 260 and 201. Operation of solenoid 201 will operate latch 203 to relax the spring 56 before the sensor k can descend far enough to operate the type drive means s; solenoid 242 will operate the latch 238, thereby returning blades 230 to their normal switch opening position; and solenoid 260 will operate to arrest the advancement of tape f. Thus, the tape remains at the same station for one more cycle and upon rotation of the cam 60 to the position shown in FIG. 8, the sensor k can again descend to operate the tape drive means s. It should be kept in mind that during the latter portion of the previous cycle, subsequent to the deenergization of the solenoids and the master switch 224 was opened, the cam 209 became effective to relatch latch lever 203 whereby the spring 56 is again tensioned so that it becomes effective to rock sensor k. During the second typing of the letter "S" or the typing of the letter "W," closing of switch 220 has no effect on the circuit because switch 231 of that order is open at this time and is closed only after the switch 224 has reopened. In other words, it can be seen that in order to have a closed circuit upon two successive operations in the same order (or in adjacent orders), the switch 231 must have been closed during the previous cycle, so that during the subsequent cycle the closing of switch 220 will produce an effective circuit for aborting tape advancement.

From the foregoing description of a preferred embodiment of the present invention it can be seen that I have provided a high-speed automatic typewriter including a memory mm effective to memorize the previously actuated sensor k, a comparator cc effective to compare the previously actuated sensor k with a presently actuated sensor, a stroke suppressor ss effective to suppress operation of the type bar driven means s and a tape arrester aa effective to abort advancement of the tape f, all of which are accumulated in a high-speed typewriter operable at typing speeds of about twice as fast as previously known automatic motorized typewriters which would produce a malfunction in light of such high speeds, in absence of the malfunction averting means of the present invention.

It will be appreciated that, by the above-described constructions, control means for a high-speed motorized automatic typewriter are provided which embody the broad principles and major assemblies of the instant invention.

It will also be appreciated that alternative embodiments of those principles and assemblies may be provided by those skilled in the art without the exercise of invention, once having consulted the instant disclosure.

Thus, a memory mm may be provided which operates upon electronic principles. On the other hand, it will be clear to those skilled in the automatic writing machine art that a comparator cc may be provided which operates substantially entirely upon mechanical principles. Thus, those skilled in the art will apply the principles of the instant invention to various known automatic writing machines in manners dictated by considerations of available space, cost of parts, assembly labor cost, etc., some of such manners of implementation of the instant invention being well within the scope of ordinary skill in the art, and some constituting valuable independent invention.

From the foregoing description of the structure shown in the drawings and explanation of the operation of the same, it will be seen that the objects set forth above, among those made apparent from the preceding descriptions, are efficiently attained, and, since certain changes may be made in the above constructions without departing from the scope of the invention, it is intended that all matter contained in the above description or shown in the accompanying drawings shall be interpreted as illustrative and not in a limiting sense.

It is particularly noted that although the instant invention has been disclosed as embodied in a typewriter of the type shown in Buckley, the principles of the invention are equally applicable to many other well-known automatic writing machines, bookkeeping machines, etc. Furthermore, the teachings of the instant invention will be applied to such machines to a greater or less extent in accordance with the increased operating speed found desirable and economical.

It is also to be understood that the following claims are intended to cover all of the generic and specific features of the invention herein described, and all statements of the scope of the invention which, as a matter of language, might be said to fall therebetween.

What is claimed is:

1. In a writing machine having a bank of a plurality of types,
    power-operated type drive means for driving said types from their rest positions to their printing positions, and
    reading means controlling selection of the type to be operated by said type drive means,
    the improvement which comprises:
        (1) an operating means for said reading means normally operating said reading means at a speed at which malfunction between adjacent types will occur;

(2) a registering device for registering the type last operated including:
- (a) a member for each type positioned in an operative position by operation of its respective type,
- (b) means for holding a member in its operative position, and
- (c) means operated by another type during its operation to release the previously operative member;

(3) means for comparing the adjacency in the bank of the operative member and the type being read by the reading means; and (4) disabling means controlled by said comparing means for momentarily disabling said reading means and operation of a type by the drive means whenever adjacency is detected.

2. The apparatus of claim 1 wherein the comparing means comprises a set of switches, one operated by each one of said members; a second set of switches, one operated by movement of each one of said types, and a circuit including both sets of switches and operative to operate said disabling means when the switch of one set represents a character within a predetermined adjacency in the bank of the switch of the second set.

3. The apparatus of claim 2 wherein the disabling means is operated by the energization of said circuit.

4. In an automatic typewriter having a bank of a plurality of type bars,
- a record reading means,
- a cyclically operated record feed means for periodically advancing a record past said reading means,
- a constantly operating type bar drive means, and
- a selecting means operated by said reading means for selecting the type bar to be operated by said drive means, the combination comprising:
(1) means for operating said type drive means at a rate $S_C$;

(2) means for normally operating said reading means, said record feed means, and said selecting means at a normal transcribing rate $S_{TN}$, the ratio $S_{TN}/S_C$ being sufficiently large to cause malfunction of said typewriting means when certain successions of symbols are typewritten, said certain successions of symbols consisting of those symbols having their type bars adjacent in the bank of said type bars, and those symbols written by successive actuations of the same type bar;

(3) means for producing a presignal comprising:
- (a) a member for each type bar which is moved from an inoperative to an operative position by operation of its type bar,
- (b) means for latching each member in an operative position,
- (c) means operated by operation of a type bar for releasing said latching means; and
- (d) means jointly operated by operation of a type bar selecting means by said reading means and an adjacent member to generate said presignal whenever the second symbol of any of said certain successions is read, and before the corresponding type drive means is actuated to drive the type bar of said second symbol; and (4) means for suppressing one advance of said record feed means and one operation of said reading means and one operation of said selecting means in response to each presignal, and thereby averting malfunctions.

5. A writing machine comprising: a bank of a plurality of types; power-operated type drive means for driving serially selected ones of said types from their rest positions to their writing positions; reading means for selecting the type to be operated by said type drive means, said reading means normally operating to effect driving of any of said types from its rest position before the previously selected type returns to its rest position; means for comparing the positions in the bank of the type last operated and the type next to be operated; and means operated by said comparing means for decreasing the rate of writing when the rest position of the previously selected type is less than a predetermined number of rest positions remote from the rest position of said any one of said types.

6. The apparatus of claim 5 wherein the means operated by said comparing means is operative to disable said reading means upon sensing adjacency of the type last operated and the next to be operated and the successive operation of the same type.

7. In a writing machine having a bank of a plurality of types,
power-operated type drive means for driving said types from their rest positions to their printing positions, and
reading means controlling selection of the type to be operated by said type drive means,
the improvement which comprises:
an operating means for said reading means normally operating said reading means at a speed at which malfunction between adjacent types will occur;
a registering device for registering the type last operated;
means for comparing the adjacency in the bank of the type registered in the registering device and the type being read by the reading means; and
disabling means controlled by said comparing means for momentarily disabling said reading means and operation of a type by the drive means whenever adjacency is detected.

8. In a writing machine having a plurality of sequentially arranged types,
power-operated type drive means for driving said types from their rest position to their printing position, and
reading means controlling operation of said type drive means,
the improvement which comprises:
an operating means for said reading means normally operating said reading means at a speed at which malfunction between adjacent types will occur;
sensing means for sensing the adjacency of type last operated and the next type to be operated; and
means controlled by said sensing means for momentarily disabling said operating means.

9. In a transcribing device including automatic cyclically operated reading means, an automatic writing means having a plurality of type bars arranged sequentially in a basket, power means for driving said type bars, and a selecting means operated by said reading means for operatively connecting a selected type bar to said power means, the rate of reading of said automatic reading means being synchronized with the rate of writing of said automatic writing means, the improvement which comprises: means for operating said reading means at a rate high enough to cause malfunction of said automatic writing means when writing in succession combinations of symbols consisting of those pairs of symbols having their corresponding type bars within a predetermined adjacency in the type basket and those pairs of symbols written by successive actuation of the same type bar; means for detecting the reading of any one of said combinations of symbols by said automatic reading means, said detecting means including a member for each type bar moved from an inoperative to an operative position by the operation of its type bar, means for latching each member in an operative position, means operated by operation of a type bar for releasing said latching means, and a circuit including a switch operated by the type bar selected for operation and a switch operated by any of the members within said predetermined degree of adjacency from the selected type bar; and a disabling means operated by said circuit for disabling said reading means and said selecting means for one cycle of said reading means in response to the detection of any one of said combinations of symbols.

10. In an automatic typewriter having a bank of a plurality of type bars, a record reading means, a cyclically operated record feed means for periodically advancing a record past said reading means, a constanty operating type bar drive means, and a selecting means operated by said reading means for selecting the type bar to be operated by said drive means, the combination comprising: means for operating said type drive means at a rate $S_C$; means for normally operating said reading means, said record feed means, and said selecting means at a normal transcribing rate $S_{TN}$, the ratio $S_{TN}/S_C$ being sufficiently large to cause malfunction of said typewriting means when certain successions of symbols are typewritten, said certain successions of symbols consisting of those symbols having their type bars adjacent in the bank of said type bars, and those symbols written by successive actuations of the same type bar; means for producing a presignal whenever the second symbol of any of said certain successions is read, and before the corresponding type drive means is actuated to drive the type bar of said second symbol; and means for suppressing one advance of said record feed means and one operation of said reading means and one operation of said selecting means in response to each presignal, and thereby averting malfunctions.

11. In an automatic, tape-controlled typewriter having a plurality of type bars,
   power-operated type drive means for driving said type bars from their rest position to their printing position,
   a tape reading means controlling operation of said type drive means, and
   a tape feeding means for moving a tape past said reading means,
the improvement which comprises:
   a memory means for registering the previously operated type bar,
   a comparator for comparing the adjacency of the character registered in the memory means and the character read by the reading means,
   suppressing means operated by said comparator for suppressing operation of said type drive means and for arresting operation of the tape feeding means when the same or adjacent characters is registered by the comparator; and
   means for clearing the memory means upon each operation of the suppressing means.

References Cited
UNITED STATES PATENTS

| | | | |
|---|---|---|---|
| 2,247,275 | 6/1941 | Buckley | 197—20 |
| 2,870,896 | 1/1959 | Riffel | 197—17 |
| 2,873,837 | 2/1959 | Clark | 197—20 |
| 2,995,231 | 8/1961 | Kummer et al. | 197—20 |
| 3,017,978 | 1/1962 | Schulz | 197—17 |
| 3,068,985 | 12/1962 | Arthur | 197—14 |

ROBERT E. PULFREY, *Primary Examiner.*

DAVID KLEIN, *Examiner.*

E. S. BURR, *Assistant Examiner.*